Sept. 1, 1964　　　M. B. WOOD　　　3,146,482
WINDSHIELD CLEANERS
Filed Jan. 23, 1963　　　3 Sheets-Sheet 1

INVENTOR.
Morris B. Wood
By his Attorney
Edward W. Fearing

United States Patent Office 3,146,482
Patented Sept. 1, 1964

3,146,482
WINDSHIELD CLEANERS
Morris B. Wood, 26 Central St., Ipswich, Mass.
Filed Jan. 23, 1963, Ser. No. 253,367
7 Claims. (Cl. 15—250.02)

The present invention relates to improvements in windshield cleaners and, more particularly to washing systems having electrically driven wiper mechanisms.

In the past it has been common to utilize a mechanically operated washer system in timed relation with a wiper mechanism. With the increase in use of electrically driven wiper mechanisms it has become desirable to take advantage of adaptability afforded by electrical connections for actuating a washer system in proper timed relation with a wiper mechanism, so that the washer system may readily be applied or omitted from an installation. A further advantage gained by an electrical timed washer is in its ease of servicing by substitution of a new or rebuilt unit for a faulty one.

An important object of this invention is to simplify and at the same time to improve the operation of a windshield washing system which is capable of reliable operation with a wiping mechanism without the necessity of mechanical timing connections. A subsidiary object is to provide a washing system which is readily adaptable to many existing wiping mechanisms without any fundamental changes in principle of operation.

To the ends noted the essential feature of the illustrated washer system comprises the use of a wiper blade, an electric motor operated mechanism therefor, a dynamic braking circuit for the wiper motor and an electrically operated pump acting when subjected to a current impulse to project a jet of wash fluid across a windshield at a fixed position in the path of movement of the wiper blade, in which system there is a synchronizing contact mechanically connected to the wiper motor to bring the wiper blade to a fixed park position and electrically connectible to the pump through the synchronizing contact to produce an effective current impulse as the wiper blade approaches closely to the jet position. The advantage of such system is that it is readily applied with many different types of pumps and washing devices, so long as the control is exercised without mechanical connections.

These and other features, as hereinafter described and claimed, will readily be apparent to those skilled in the art from the following detailed specification, taken in connection with the annexed drawings, in which;

Figure 1:
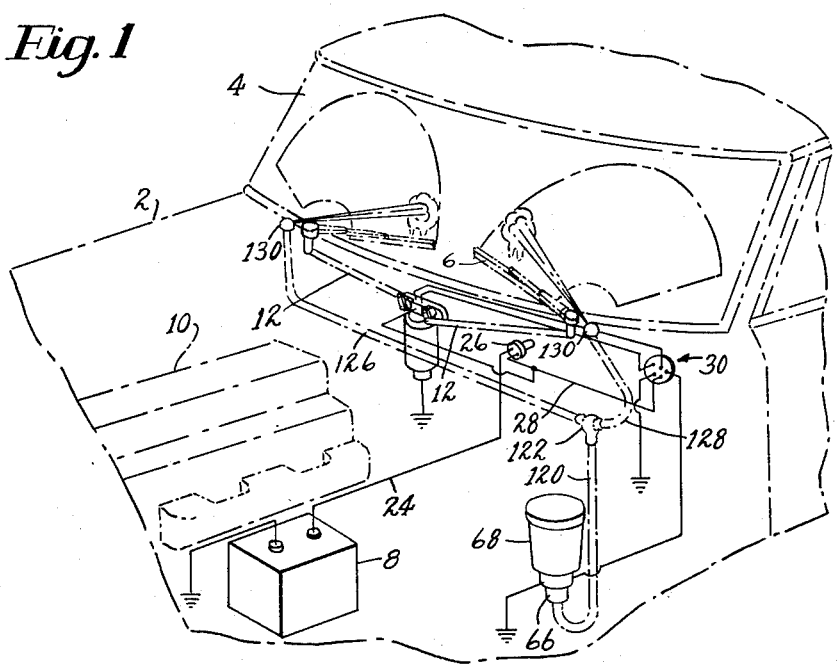
FIG. 1 is schematic perspective view, looking from the front and right of an automobile equipped with a combined windshield wiping and washing arrangement embodying the features of the present invention.

The present invention is illustrated as applied to an automobile windshield wiping and washing arrangement but is effective in other applications where visibility of observation through transparent material is important.

The wiping is accomplished by a wiper blade and electrically driven mechanism, while the washing is timed with relation to the wiping through a current impulse produced just as the wiper blade approaches closely to a position where a washing jet is projected across the windshield. In so doing the full benefit is obtained from a minimum amount of washing fluid spread over a maximum area by the wiper blade, the fluid being spread over the windshield before it can be blown away by air drafts.

Referring to the drawings, an automobile body is indicated at 2, a windshield at 4, a pair of wiper blades at 6, a storage battery at 8 and an engine at 10. For driving the wiper blades they are connected by linkages 12, including cranks 14 (FIG. 2) rotating with two worm wheels 16, meshing with a comon worm 18 mounted on a shaft 20 of an electrical motor 22. As is usual with windshield wiper blades they are normally held while inoperative in park positions, shown in FIG. 1, with both blades at lowered center locations out of the lines of vision of a driver and passenger.

To control the operation of the wiper blade actuating motor 22 the motor is grounded with one pole of the battery 8. The other side of the battery is connected by a live wire 24 to an ignition switch 26 and thence by service wire 28 to a panel switch 30. The panel switch is of the double throw type, in one position of which a running contact 32 connects the service wire 28 through a wire 34 to the motor 22 for operation of the wiper blades and in the other position of which the motor is connected to a dynamic braking circuit from a ground wire 36. The ground wire 36 leads from the panel switch 30 through its movable contact to a braking contact 38. From the braking contact the braking circuit includes the wire 40 and an impulse contact 42 cooperating with a synchronizing contact 44 in a timing switch 46 driven by one of the worm wheels 16. The synchronizing contact 44 is connected through a wire 48 back to the motor to provide a short circuit for the motor when contact 44 engages contact 42.

To time the synchronizing contact 44 it is engaged by the periphery of a snail cam 50 fixed to a shaft 52 on which the worm wheel for driving it also is fixed. The cam 50 is so oriented on the shaft 52 that the synchronizing contact completes the circuit through the impulse contact 42 sufficiently ahead of park positions for the wiper blades to enable stopping accurately at that location when the panel switch 30 is shifted to connect the dynamic braking contact.

To insure against stopping the wiper blades at any other than park positions the synchronizing contact 44 moves alternately from the impulse contact 42 to a blade return contact 54, which in turn is connected through a wire 56 to the service wire 28. So long as the synchronizing contact engages the return contact the motor will drive the wiper blades, even though the panel switch is shifted to "OFF" position.

It will be appreciated from the arrangement of the dynamic braking circuit that while the panel switch is in "ON" position there will be an impulse applied to the contact 42 during each rotation of the shaft 52 just ahead of the park positions of the wiper blades. It is this impulse which is utilized to actuate a washer pump.

Figure 3:
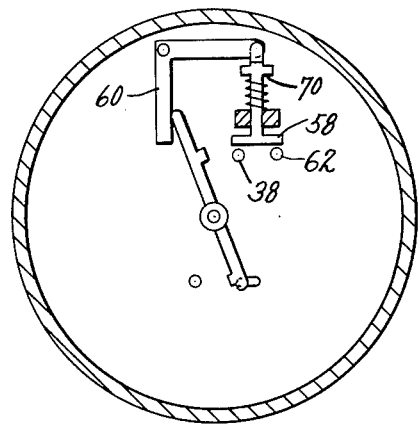
FIG. 3 is a detail view, partly in section of a manually controlled panel switch employed in the wiping and washing arrangement of FIG. 1.

To transfer the impulse on the contact 42 to a washer pump the panel switch is equipped with a bridging contact 58 actuated by an extra movement of the panel switch beyond the "ON" position, much the same as the starter of an engine is energized by an extra movement of an ignition switch. To this end the moveable contact of the panel switch engages an insulating lever 60 fulcrumed on the switch frame and arranged to press the bridging contact 58 against the braking contact 38 and a pump contact 62. From the contact 62 an impulse is carried along a wire 64 to a pump 66, including a wash fluid reservoir 68, which may be in the form of a die cast metal tank or a plastic bag containing wash fluid. The bridging contact 58 is secured to a spring pressed slide 70, as shown in FIG. 3, so that when the operator's hand releases the panel switch the spring on the slide disengages the bridging contact from the pump and braking contacts 38 and 62.

Figure 4:
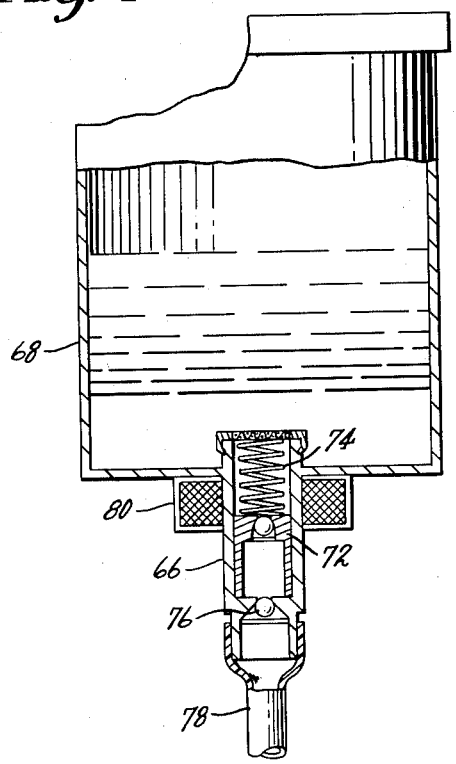
FIG. 4 is a detail sectional view of a combined reservoir and pump capable of effective use in the washing system.
Figure 5:
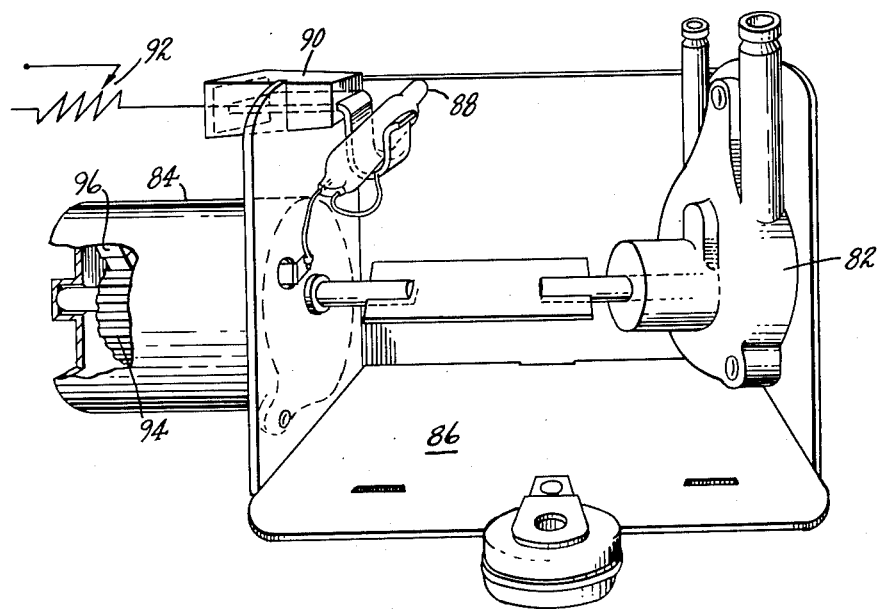
FIG. 5 is a detail perspective view of a rotary pump having certain advantages in use with the washing system.

The wash fluid pump 66 may consist of a simple die cast cylinder, shown in FIG. 4, with a magnetic piston 72 or a number of other forms of propelling devices. In the form shown in FIG. 4 an integral casting is utilized with a spring 74 acting on the piston to force fluid through an outlet valve 76 and a delivery tube 78 to nozzles located in fixed positions on the windshield with relation to the park positions of the wiper blades.

In utilizing the impulse of the braking contact 42, the cylinder of the pump is surrounded by a coil 80, one end of which is grounded and the other end of which is connected to the braking contact. The advantage of this arrangement is that regardless of momentary variations in line voltage a constant unvarying application of fluid will result each time the solenoid is energized.

In another form of washer having certain desirable features, a rotary pump 82 is employed separated adequately from an axially coupled driving motor 84 to prevent contamination by washing fluid. In this case both the pump and the motor are mounted on a U-shaped metal standard 86 carrying also a circuit breaker 88 for protecting the motor and a connector plug 90 are substituted for the cylinder pump of FIG. 4. With the motor driven pump no valves are required and the characteristics of the pump enable it to start rotation relatively slowly and to increase to a maximum, so that jets of wash fluid will be projected first a short distance along the windshield and then a greater distance over the path of movement of the wiper blade.

To control and regulate the distance across the windshield reached by the jets when a rotary pump or other is used, the wired connection between the circuit breaker 88 has in series with it a rheostat 92, which determines the top speed at which the motor 84 will run, the motor being of the series wound type with a commutator 94 and brushes, one of which is shown at 96.

Figure 6:
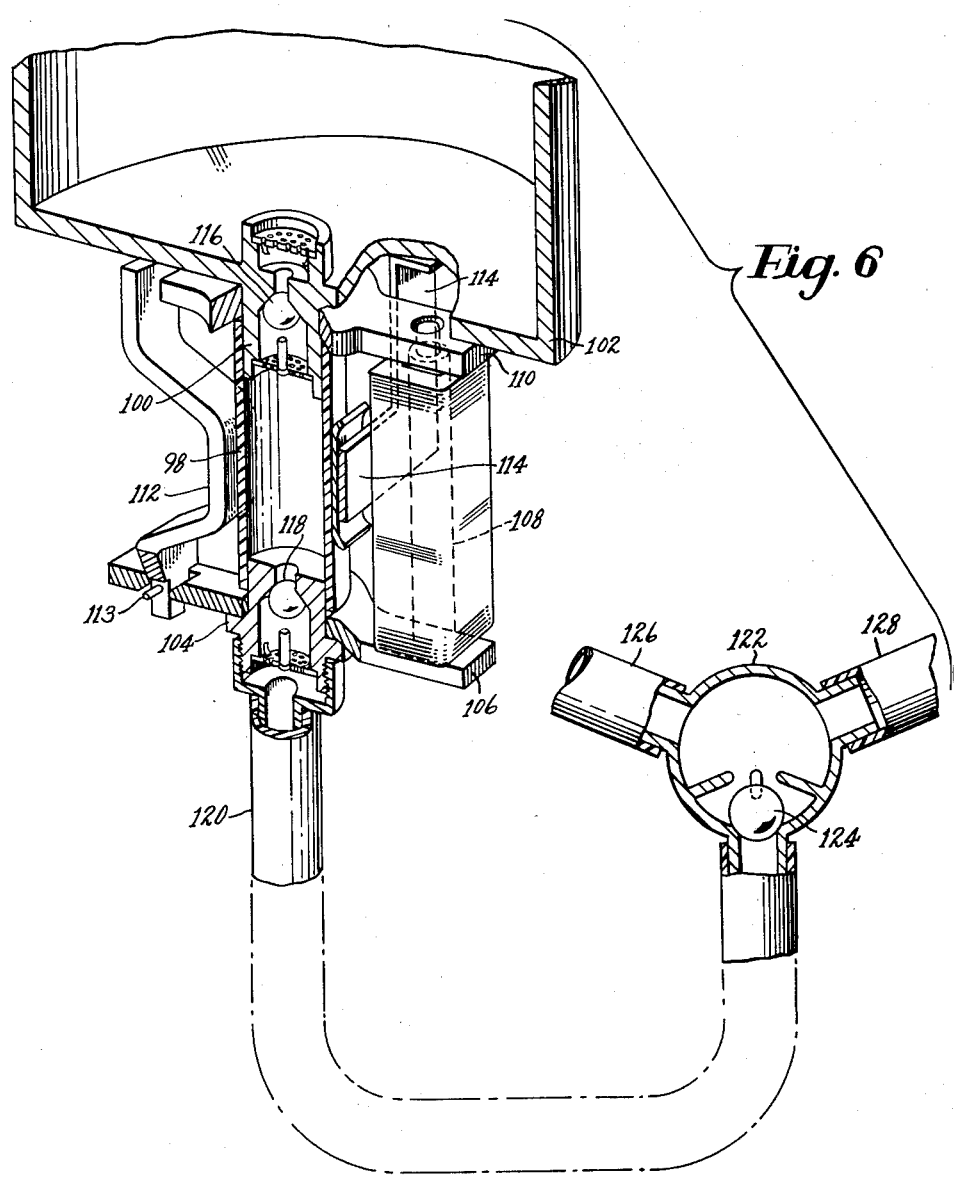
FIG. 6 is a detail sectional view of a combined reservoir and pump having characteristics advantageous in ease of manufacture.

A third form of washer fluid pump is illustrated in FIG. 6. This form is of the squeeze tube type, the tube being indicated at 98, composed of neoprene or other durable and resistant synthetic rubbery material. The tube is supported at one end from a nipple 100 extending downwardly from the bottom of a reservoir 102 for a supply of wash fluid. At the other end the squeeze tube is supported by a ferrule 104 secured within an opening in a magnetic yoke 106. The magnetic yoke 106 has rigidly projecting from one end a vertical core piece of soft iron surrounded by a coil 108 also secured at its upper terminal to a second magnetic yoke 110. The yoke 110 is supported on the nipple 100 close to the bottom of the reservoir 102. At the opposite side of the tube 98 the yokes are bridged by a reversely bent armature 112, a reduced lower end of which is inserted loosely in an opening in the yoke 106, a pin 113 in the armature retaining it in position with freedom for limited movement. The upper end of the armature is normally disposed in spaced relation from the yoke 110 so that when the coil 108 is energized the armature quickly closes the gap between it and the yoke 110, thus squeezing the tube 98 with its reversely bent portion.

To assist in squeezing the tube 98 the side of the tube opposite the armature is backed by a nonmagnetic shoe 114 made fast to the bottom of the reservoir 102. When the tube is squeezed a pair of valves 116 and 118 in the nipple 100 and the ferrule 104 provide proper resistance to the flow of fluid in any but a direction toward the jets.

Figure 2:
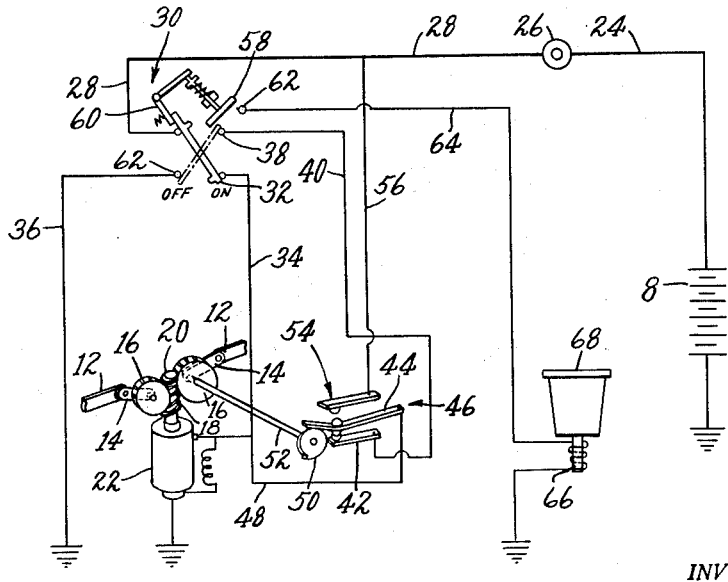
FIG. 2 is a wiring diagram employed by the wiping and washing arrangement illustrated in FIG. 1.

With all of the forms of pump illustrated the wash fluid is conducted to the jets through a main pipe line 120, as in FIGS. 6 and 1 to a T-fixture 122, preferably containing an auxiliary valve 124 to prevent seepage of the fluid back to the pump. From the T-fixture the fluid divides through pipes 126 and 128 to nozzles 130 for the jets (FIGS. 1 and 6).

The nozzles 130 are located in fixed positions with relation to the path of movement of the wiper blades 6, such that the jets are projected just ahead of the park positions of the wiper blades. Of course, the jets are not projected when the wiper blades are stopped in park positions because the panel switch will be moved to "OFF" position before the wiper blades are stopped. Thus, the bridging contact cannot close the circuit to the pump under these conditions.

The nature and scope of the invention having been indicated and a particular reembodiment with three variations having been described, what is claimed is:

1. A windshield cleaner having a wiper blade, a driving mechanism including an electric motor for moving the blade across the windshield and a dynamic braking circuit for bringing the wiper blade to a park position, an electrically operated pump acting when subjected to an impulse to project a jet of wash fluid across the windshield at a fixed position in the path of movement of the wiper blade, in combination with a synchronizing contact mechanically connected to the wiper blade driving mechanism and electrically connected either to the pump to produce an effective current impulse in the pump as the blade approaches closely to the jet position during operation of the motor or to the braking circuit upon disconnection of the motor from its source of power.

2. A windshield cleaner as in claim 1, in which, a manually controlled panel switch of the double throw type connects the motor for regular operation when thrown in one direction and connects the synchronizing contact to the dynamic braking circuit when thrown in the other direction.

3. A windshield cleaner as in claim 1, in which, a manually controlled panel switch of the double throw type having dynamic braking and running contacts to connect the motor to the running contact when thrown in one direction, to connect the motor to the dynamic braking contact when thrown in the other direction, and to connect the dynamic braking contact with the pump when thrown further in the second mentioned direction after connecting the motor to the running contact.

4. A windshield cleaner as in claim 3, in which, the panel switch has a third contact connected to the pump and bridging means for connecting the dynamic braking contact with the pump contact when the switch is thrown further in the second mentioned direction.

5. A windshield cleaner as in claim 3, in which, the panel switch is given an extra movement in the direction for regular operation of the motor to connect the synchronizing contact with the pump.

6. A windshield cleaner as in claim 5, in which, the synchronizing contact is actuated by a cam driven by the wiper blade mechanism.

7. A windshield cleaner as in claim 6, in which, an auxiliary motor driving contact is engaged by the synchronizing contact to bring the wiper blade through a major part of its motion under power when required to bring it to a park position.

References Cited in the file of this patent

UNITED STATES PATENTS 3,055,304    Ziegler _____ Sept. 25, 1962

FOREIGN PATENTS 836,293    Germany _____ Apr. 10, 1952
915,421    Germany _____ July 22, 1954